(12) United States Patent
Whitener (10) Patent No.: US 9,051,026 B2
(45) Date of Patent: Jun. 9, 2015

(54) RIDING WALKERS HAVING PEDAL DRIVE ASSEMBLIES

(71) Applicant: Philip C. Whitener, Silverdale, WA (US)

(72) Inventor: Philip C. Whitener, Silverdale, WA (US)

( * ) Notice: Subject to any disclaimer, the term of this patent is extended or adjusted under 35 U.S.C. 154(b) by 0 days.

(21) Appl. No.: 13/745,362

(22) Filed: Jan. 18, 2013

(65) Prior Publication Data

US 2014/0203536 A1 Jul. 24, 2014

(51) Int. Cl.
*B62M 9/00* (2006.01)
*B62M 1/36* (2013.01)

(52) U.S. Cl.
CPC ...................... *B62M 1/36* (2013.01)

(58) Field of Classification Search
CPC ........................................ B62M 1/36
USPC ........... 280/304.1, 250.1, 233, 288.4; 482/61, 482/60, 57
See application file for complete search history.

(56) References Cited

U.S. PATENT DOCUMENTS

| 4,462,488 | A  | * | 7/1984 | Boyd ........................ 192/217.1 |
| 5,324,060 | A  | * | 6/1994 | Van Vooren et al. ....... 280/304.1 |
| 5,464,074 | A  | * | 11/1995 | Yoshikawa ................ 188/24.22 |
| 7,108,004 | B2 | * | 9/2006 | Cowie et al. .................... 135/74 |
| 2001/0011613 | A1 | * | 8/2001 | Schaffner et al. ............ 180/65.1 |
| 2009/0020979 | A1 | * | 1/2009 | Genda et al. .................. 280/255 |

* cited by examiner

*Primary Examiner* — Joseph M Rocca
*Assistant Examiner* — Jacob Knutson (57) ABSTRACT

In at least some embodiments, a riding walker assembly includes a support assembly and a drive assembly. The support assembly may include a frame work supporting a seat assembly, and a plurality of wheels operatively coupled to the frame work and configured to rollably engage a floor surface. The drive assembly may include a drive wheel configured to engage the floor surface, and a pedal assembly operatively coupled to the drive wheel such that rotation of the pedal assembly rotates the drive wheel. The riding walker assembly may further include a coupling assembly operatively coupling the drive assembly to the support assembly, the coupling assembly being configured to selectively engage and disengage the drive wheel from the floor surface.

10 Claims, 13 Drawing Sheets

RIDING WALKERS HAVING PEDAL DRIVE ASSEMBLIES

FIELD OF THE INVENTION

The present disclosure is directed to walker apparatus and methods, and more specifically, to riding walkers having a pedal drive assembly.

BACKGROUND OF THE INVENTION

Walkers and wheelchairs are popular devices for assisting people with mobility. Conventional walkers typically provide a stable base which provides support when the person is taking steps, and then is lifted and moved to a new location, enabling the person takes additional steps. Such walkers have evolved to a 4 wheel configuration that includes a seat permitting a person to rest or to be pushed by an attendant. Although the wheeled walker greatly improves mobility for short distances, the operation is tiring for those with limited strength. At present heavy and expensive electric wheelchairs are prescribed for such cases. Alternately, wheelchairs typically allow a person to move without exerting their legs by means of an attendant or by drive wheels that are driven using the person's arms, or a motorized drive assembly. Although desirable results have been achieved using such prior art devices, there is room for improvement.

SUMMARY

Systems and methods for riding walkers having a pedal drive assembly are disclosed. Embodiments of systems and methods in accordance with the teachings of the present disclosure may advantageously enable a user to enjoy the usual and customary benefits of conventional wheel chair apparatus and walker apparatus, but also provide additional capability with respect to speed and mobility, and to exercise their legs using the pedal drive assembly whenever they so desire. Embodiments in accordance with the present disclosure may also meet the need for a low cost, light weight, easily portable device that transports an occupant at reasonable speed using minimal energy.

In at least some embodiments, using riding walker assemblies in accordance with the present disclosure, a user may exercise their legs while in a seated position, and may travel along a desired travel path while in a seated position without the need for exerting their upper body. Providing the capability to pedal in accordance with the present disclosure may have considerable therapeutic and physiological advantages over conventional assemblies which require a user to walk upright to exercise their legs. Similarly, providing a capability to travel while in a seated position using the pedal drive assembly may provide considerable advantages to those users who have healthy legs and who may not have healthy arms or upper body as required by conventional wheel chair apparatus.

In at least some embodiments, a riding walker assembly in accordance with the teachings of the present disclosure includes a support assembly and a drive assembly. The support assembly may include a frame work supporting a seat assembly, and a plurality of wheels operatively coupled to the frame work and configured to rollably engage a floor surface. The drive assembly may include a drive wheel configured to engage the floor surface, and a pedal assembly operatively coupled to the drive wheel such that rotation of the pedal assembly rotates the drive wheel. The riding walker assembly may further include a coupling assembly operatively coupling the drive assembly to the support assembly, the coupling assembly being configured to selectively engage and disengage the drive wheel from the floor surface.

This summary is not intended to be limiting, but rather, is merely intended to introduce a few possible embodiments of riding walker assemblies in accordance with the teachings of the present disclosure. Additional embodiments and aspects in accordance with the teachings of the present disclosure are described more fully below.

BRIEF DESCRIPTION OF THE DRAWINGS

Embodiments of the present disclosure are described in detail below with reference to the following drawings.

DETAILED DESCRIPTION

The present disclosure is directed to systems and methods for riding walker assemblies having a drive assembly. Many details of specific embodiments in accordance with the present disclosure are set forth in the following description and in FIGS. 1-22 to provide a thorough understanding of such embodiments. One skilled in the art, however, will understand that the present invention may have additional embodiments, and that alternate embodiments of the invention may be practiced without one or more of the details described in the following description.

Figure 1:
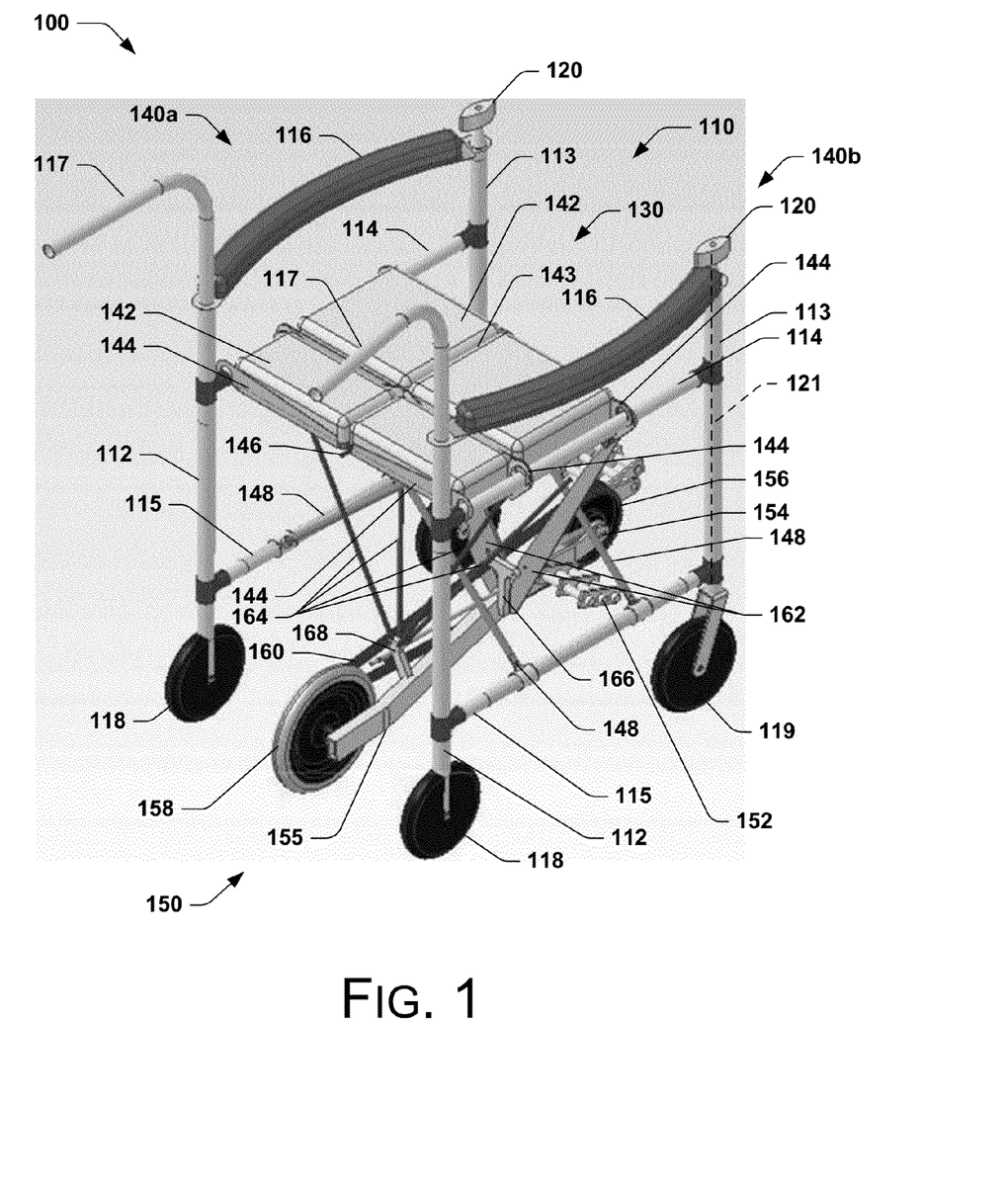
FIG. 1 is an isometric view of an embodiment of a riding walker assembly in accordance with the teachings of the present disclosure.

FIG. 1 is an isometric view of an embodiment of a riding walker assembly 100 in accordance with the teachings of the present disclosure. In this embodiment, the riding walker assembly 100 includes a frame assembly 110 having a seat assembly 130, and a pedal drive assembly 150 that enables a user (not shown) to propel the riding walker assembly 100 using their legs while seated on the seat 130.

More specifically, in the embodiment shown in FIG. 1, the frame assembly 110 includes aft vertical members 112 and forward vertical members 113 operatively coupled to upper horizontal members 114 and lower horizontal members 115. Armrest members 116 extend between the aft and forward vertical members 112, 113 and allow a user seated on the seat assembly 130 to rest their arms. Handles 117 are positioned at the top of the aft vertical members 112, and rear wheels 118 are positioned at the bottom of the aft vertical members 112. Similarly, front wheels 119 are positioned at the bottom of the forward vertical members 113. In the embodiment shown in FIG. 1, each of the front wheels 119 is castered, and is steerably controlled by a steering knob 120 located at the top of each corresponding forward vertical member 113. Since both front wheels are castered, steering may be accomplished from either side. Each steering knob 120 is operatively coupled by a connector (e.g. a connecting shaft) (not visible) which extends through each corresponding forward vertical support 113 to a corresponding one of the front wheels 119. In alternate embodiments, other steering arrangements may be implemented. The modular construction of the side frame assemblies 140 enables the walker 100 to be folded easily for transport, as described more fully below.

Figure 2:
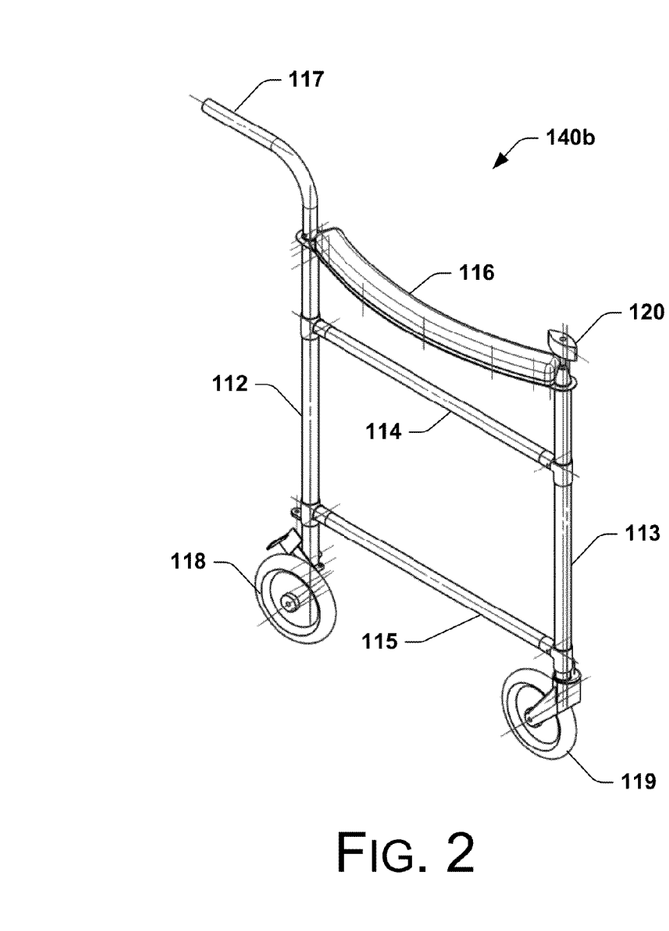
FIG. 2 is an isometric view of a side assembly of a frame assembly of the riding walker assembly of FIG. 1.

The frame assembly 110 may be configured in a variety of suitable embodiments. For example, in at least some embodiments, the frame assembly 110 of the embodiment shown in FIG. 1 may be configured to include two side assemblies 140a, 140b (e.g. left and right side assemblies 140a, 140b). With reference to FIG. 2, which shows the right side assembly 140b, each side assembly 140a, 140b may include one of each of the aft and forward vertical supports 112, 113, the upper and lower horizontal members 114, 115, the armrest member 116, the handle 117, the rear and front wheels 118, 119, and the steering knob 120.

Figure 3:
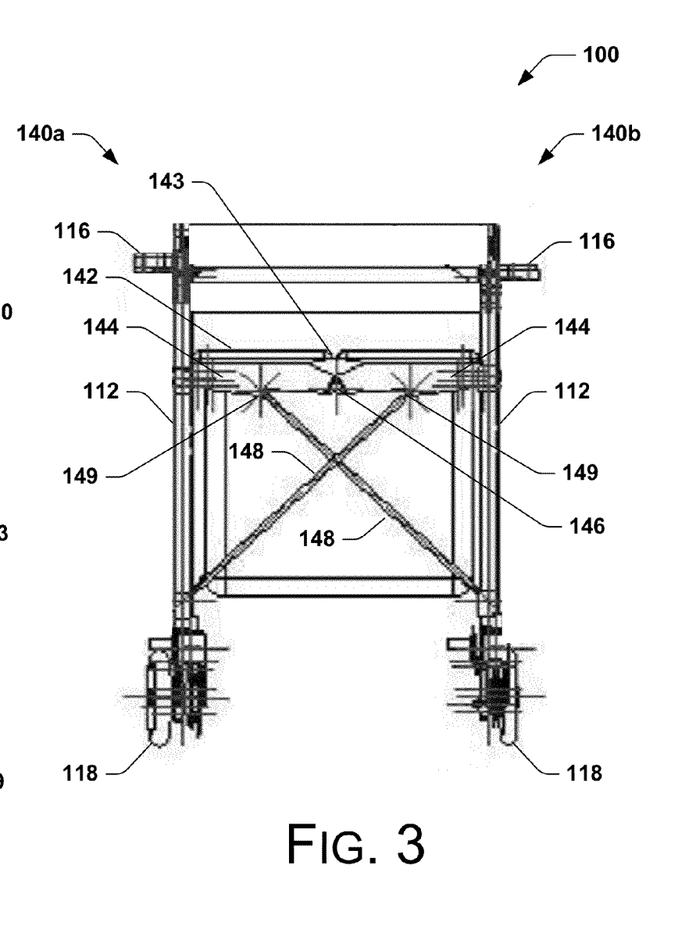
FIG. 3 is a rear elevational view of the riding walker assembly of FIG. 1.

The side assemblies 140a, 140b of the frame assembly 110 may be operatively coupled in a variety of suitable ways. For example, referring again to FIG. 1, one or more foldable seat members 142 (two shown) may extend between the upper horizontal members 114 between each of the side assemblies 140a, 140b. The seat members 142 may be foldable along a hinge line 143. A plurality of stringers 144 (six are visible in FIG. 1) are positioned along the forward and aft edges of the seat members 142 and extend inwardly from the upper horizontal members 114 of each of the side assemblies 140a, 140b to a coupling rod 146. In addition, as best shown in FIGS. 1 and 3, a plurality of struts 148 (four are present, three are visible in FIG. 1) are coupled to the lower horizontal members 115 of the side assemblies 140a, 140b and extend upwardly and across to a corresponding plurality of mid-span locations 149 on the stringers 144 to stabilize the walker laterally.

Figure 4:
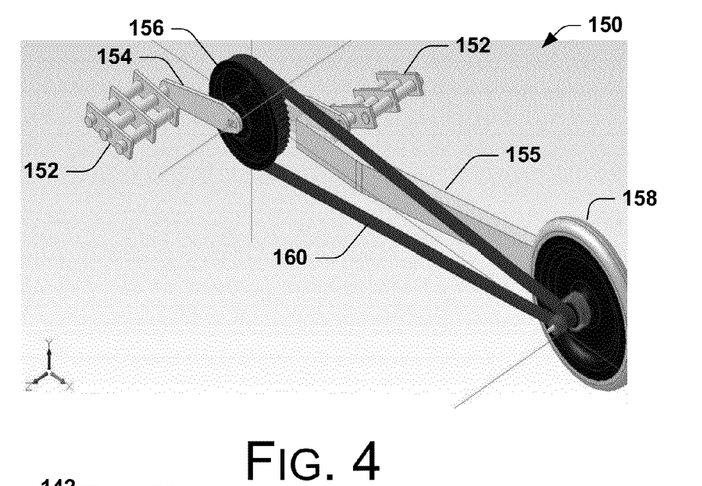
FIG. 4 is an isometric view of a pedal drive assembly of the riding walker assembly of FIG. 1.

FIG. 4 shows an isometric view of the pedal drive assembly 150 of the riding walker assembly 100 of FIG. 1. In this embodiment, the pedal drive assembly 150 includes a pair of pedals 152 mounted on a crankshaft member 154 that extends through a drive pulley 156. A support beam 155 extends rearwardly from the crankshaft member 154, and a drive wheel 158 is rotatably mounted on support beam 155. A drive belt 160 is operatively coupled between the drive pulley 156 and the drive wheel 158 such that rotation of the drive pulley 156 causes rotation of the drive wheel 158. The support beam 155 may assume a variety of suitable embodiments, including an angled beam member as depicted in FIG. 4, an angled tubular member (e.g. FIG. 13), or any other suitable structure.

The pedal drive assembly 150 may be attached to the frame assembly 110 in a variety of suitable ways to constrain the drive assembly 150 in both the operational and folded configurations. For example, one suitable attachment of the pedal drive assembly 150 to the frame assembly 110 will now be described with reference to FIGS. 1 and 5 through 8. As shown in FIG. 1, the pedal drive assembly 150 is operatively coupled to the frame assembly 110 by a truss framework to provide a fixed relationship between the drive assembly 150 and the frame assembly 110 comprised of a plurality of forward spars 162 (in this embodiment, two forward spars 162) and a plurality of aft spars 164 (in this embodiment, four aft spars 164). The truss framework is proportioned and joined to the frame assembly 110 and the drive assembly 150 at an appropriate geometry to allow the riding walker assembly 100 to be folded compactly.

More specifically, each forward spar 162 extends from a forward attachment portion 166 on the support beam 155 upwardly and outwardly to a corresponding one of the upper horizontal members 114. Similarly, each aft spar 164 extends from an aft attachment portion 168 on the support beam 155 upwardly and outwardly to attachment points on the upper horizontal members 114 (or other suitable attachment locations on the frame assembly 110). In general, it will be appreciated that other suitable configurations for attaching the pedal drive assembly 150 to the frame assembly 110 may be implemented without departing from the spirit or scope of the invention.

Figure 5:
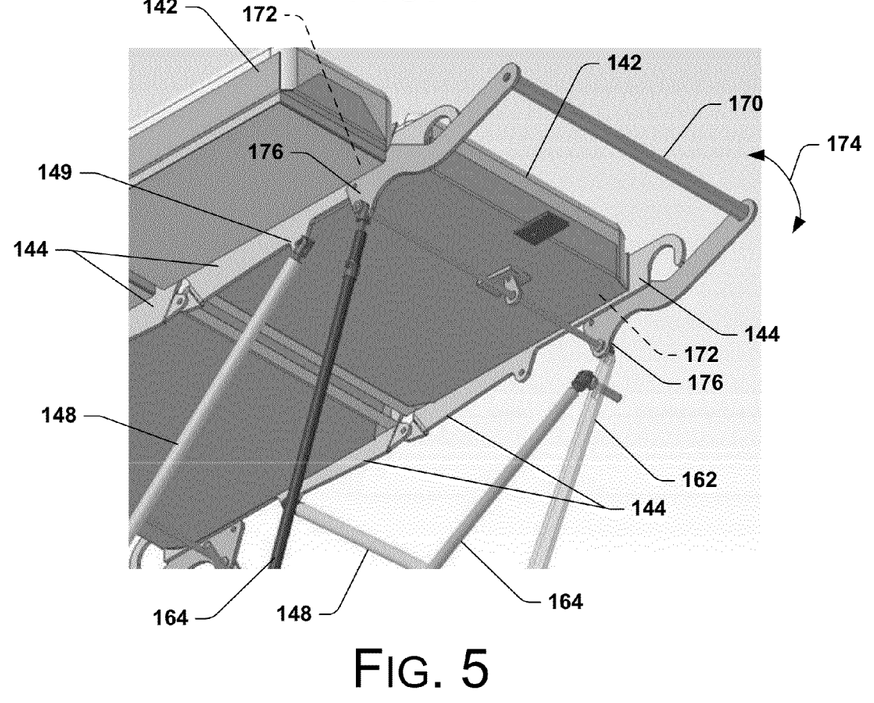
FIG. 5 is an isometric view of a portion of the riding walker assembly of FIG. 1.
Figure 6:
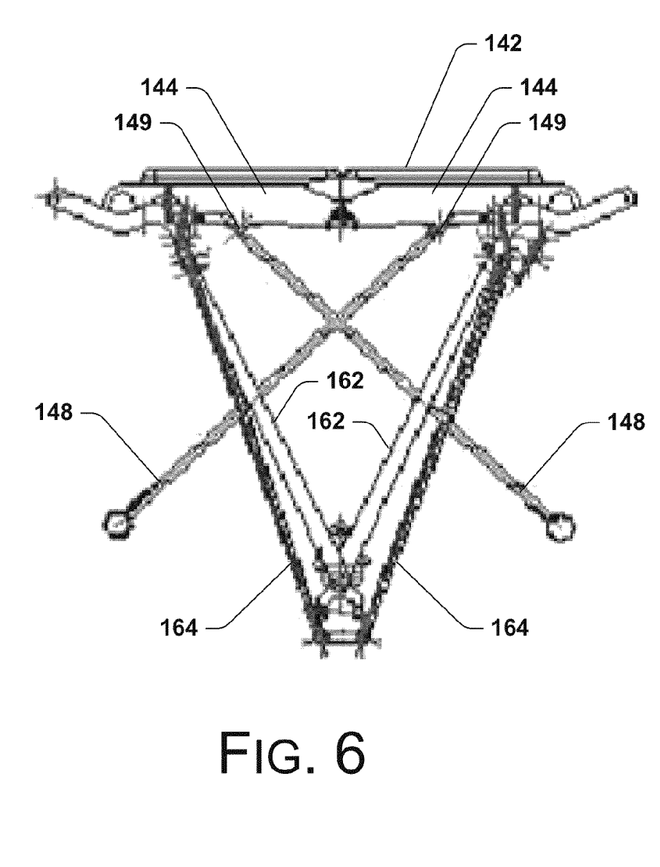
FIG. 6 is a rear elevational view of a portion of the riding walker assembly of FIG. 1.
Figure 7:
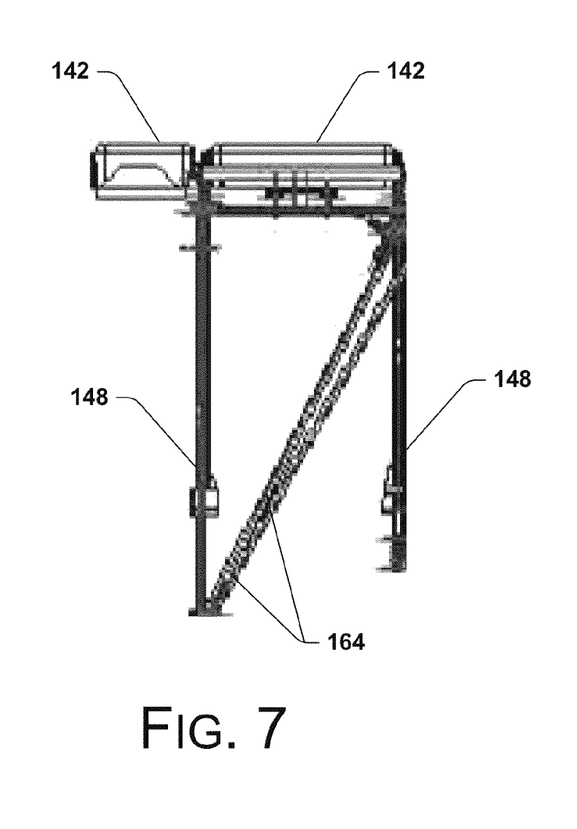
FIG. 7 is a side elevational view of a portion of the riding walker assembly of FIG. 1.
Figure 8:
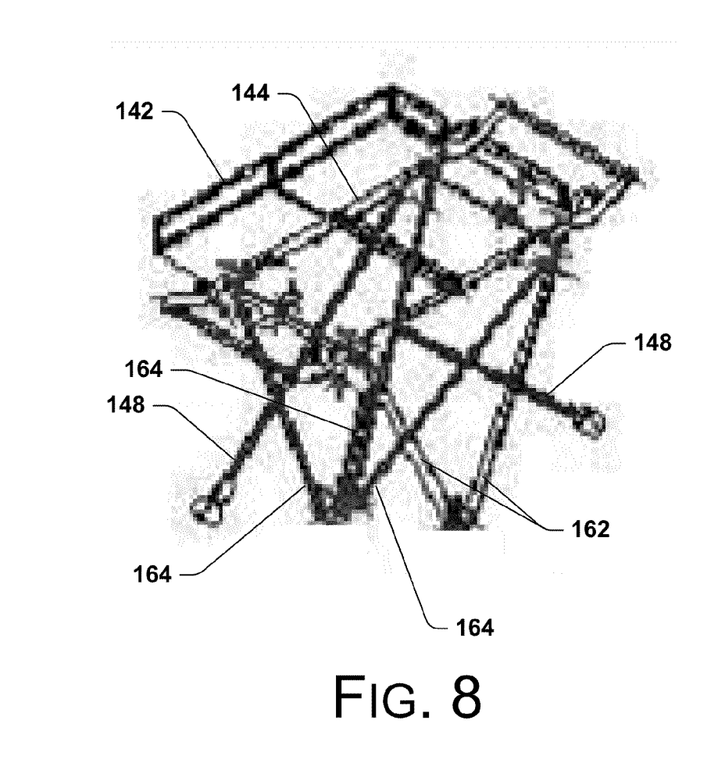
FIG. 8 is a lower isometric view of a portion of the riding walker assembly of FIG. 1.

As best shown in FIG. 5, in at least some embodiments, a pair of handles 170 (one visible in FIG. 5) may extend laterally outwardly from the seat members 142. Each handle 170 may be hingeably coupled at hingepoints 172 to a pair of the stringers 144 such that the handle 170 is pivotably moveable along an arc 174. The forward and aft spars 162, 164 extend upwardly from the support beam 155 (FIGS. 1 and 4) and couple to the handles 170. It will be appreciated that as the handles 170 are moved downwardly along the arc 174 into an lower position, the forward and aft spars 162, 164 are drawn upwardly such that the drive wheel 158 is retracted upwardly from the floor.

Figure 12:
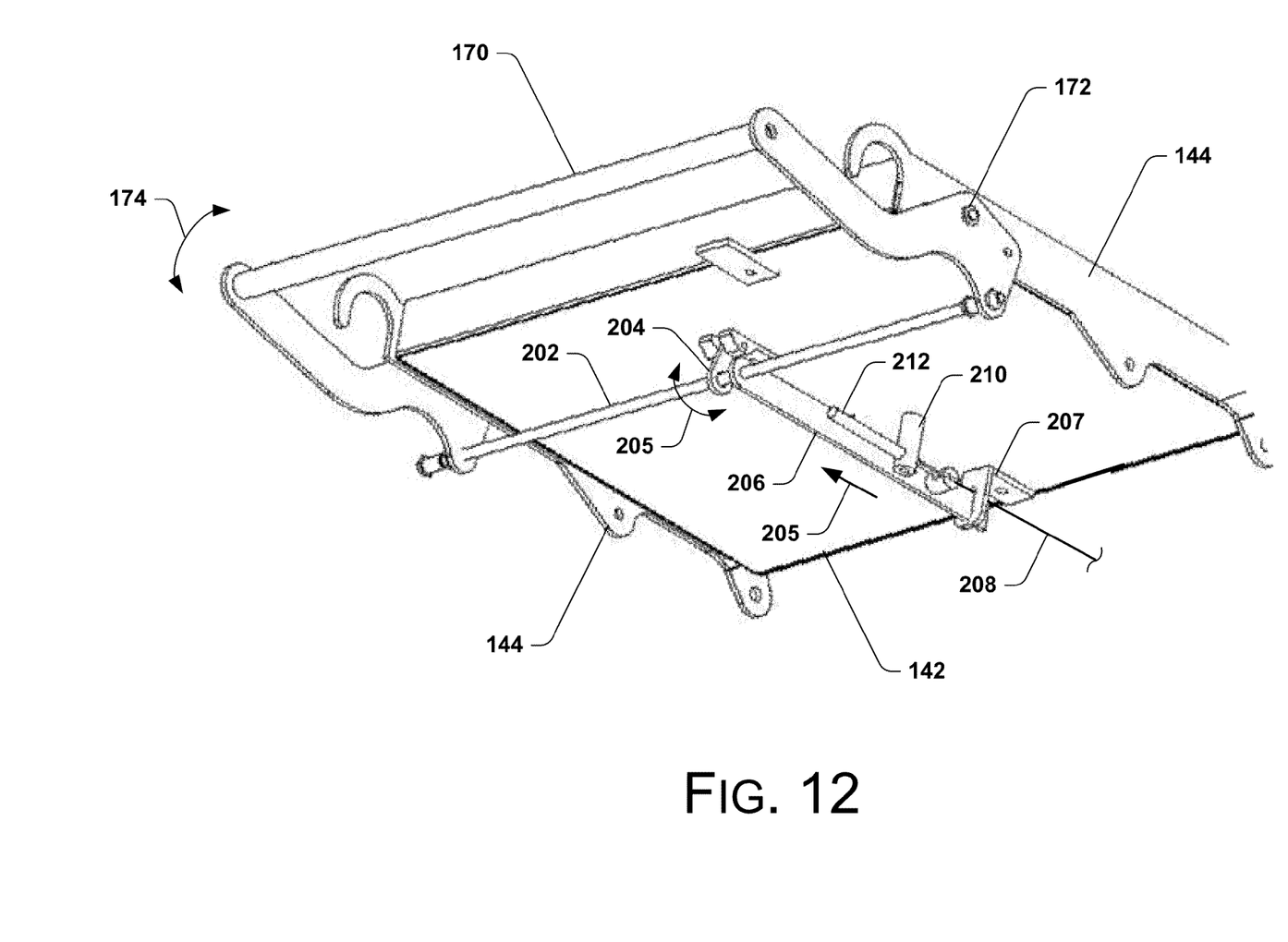
FIG. 12 is an enlarged, partial isometric view of a seat member of the riding walker assembly of FIG. 1 in accordance with the teachings of the present disclosure.

In some embodiments, the riding walker assembly 100 may further include a braking system 200 that may engage one or more of the rear wheels 118 or the front wheels 119 to prevent the riding walker assembly 100 from rolling. For example, FIG. 12 is a lower isometric view of one of the seat members 142 of the riding walker assembly 100. As shown in FIG. 12, in this embodiment, a first portion of the braking system 200 includes a first actuation member 202 coupled to the handle 170. The first actuation member 202 moves with the handle 170 as the handle 170 is selectively pivoted upwardly and downwardly through the arc 174. A support link 204 is secured to the seat member 142 and is rotatably coupled to the first actuation member 202 such that the support link 204 may pivot through a pivot arc 205 as the handle 170 is pivotably moved through the arc 174. The support link 204 deflects first actuation member 202 to provide an "over center" mechanism to hold the handle in either the up or down position, as described more fully below.

The braking system 200 further includes a second actuation member 206 having a first end portion rotatably coupled to the first actuation member 202, and extending transversely with respect to the first actuation member 202. A second end portion of the second actuation member 206 slidably engages a support bracket 207 attached to the seat member 142, and is secured to a brake cable 208. In this embodiment, the brake cable 208 is also engaged through a stop post 210 which projects downwardly from the seat member 142, and a stop member 212 is attached to an end portion of the brake cable 208 to prevent the brake cable 208 from disengaging from the stop post 210.

Figure 13:
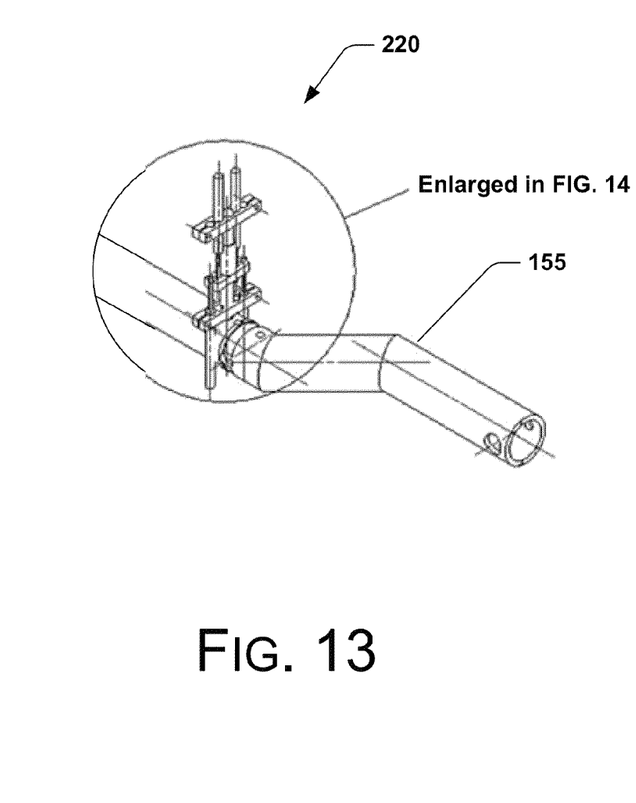
FIG. 13 is an isometric view of a brake collector assembly in accordance with the teachings of the present disclosure.
Figure 14:
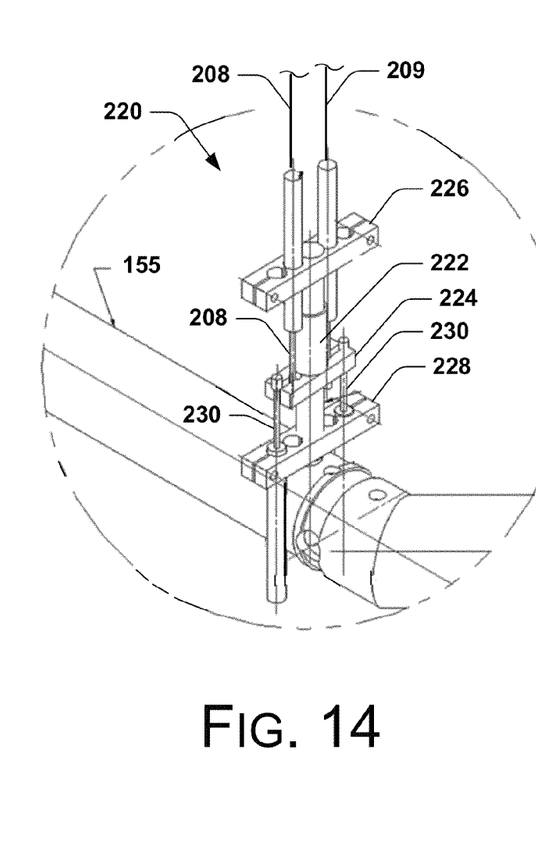
FIG. 14 is an enlarged isometric view of the brake collector assembly of FIG. 13.

The brake assembly 200 may further include a brake collector assembly 220. As shown in FIG. 13, in this embodiment, the brake collector assembly 220 includes a main member 222 coupled to and projecting upwardly from the support beam 155. FIG. 14 is an enlarged isometric view of the brake collector assembly 220 of FIG. 13. In this embodiment, a slide member 224 is slideably engaged onto the main member 222. The brake cable 208 is engaged through an upper cable guide 226 and is securely coupled to the slide member 222. In some embodiments, a second brake cable 209 may be coupled to the other handle 170 in the manner described above with respect to FIG. 12, and may be engaged through the upper cable guide 226 and be secured with the slide member 222.

Figure 15:
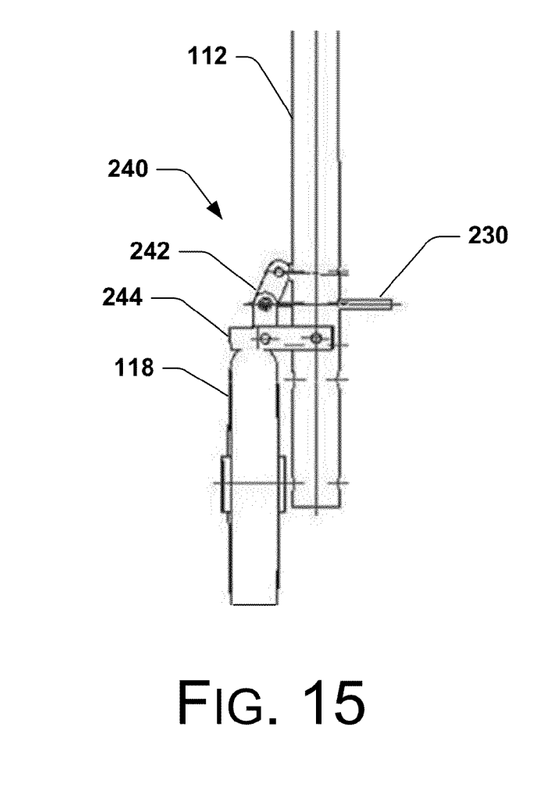
FIG. 15 is an elevational view of a brake shoe engaged with a wheel in accordance with the teachings of the present disclosure.

As further shown in FIG. 14, a lower cable guide 228 is coupled to the main member 228. Secondary cables 230 are secured to the slide member 222 and extend downwardly through the lower cable guide 228. As shown in FIG. 15, each secondary cable 230 extends to a distal brake assembly 240 mounted on the aft vertical support 112 proximate each rear wheel 118. More specifically, in at least some embodiments, each secondary cable 230 extends through the aft vertical support 112 and is coupled to a linkage 242 having a first end coupled to the aft vertical support 112 and a second end coupled to a brake shoe 244.

In operation, a user may actuate the handle(s) 170 (FIG. 12) along the arc 174 which, in turn, pivots the pivot member 204 along the arc 205 (FIG. 12), drawing the second actuation member 206 along a first direction 205 and causing tension in the brake cable 208. As the brake cable 208 is tensioned, the slide member 224 is drawn upwardly along the main member 224, causing tension in the secondary cables 230 (FIG. 14). Similarly, as the secondary cables 230 are tensioned, each secondary cable 230 pulls its respective linkage 242 inwardly towards the aft vertical member 112, forcing the brake shoe 244 into engagement with the rear wheel 118. The frictional engagement of the brake shoes 244 with the rear wheels 118 brakes the rear wheels 118, locking the rear wheels 118 in place to prevent the riding walker assembly 100 from rolling. For example, the braking system 200 may be applied to allow the occupant to safely unseat or seat himself before engaging the drive wheel 158.

Figure 9:
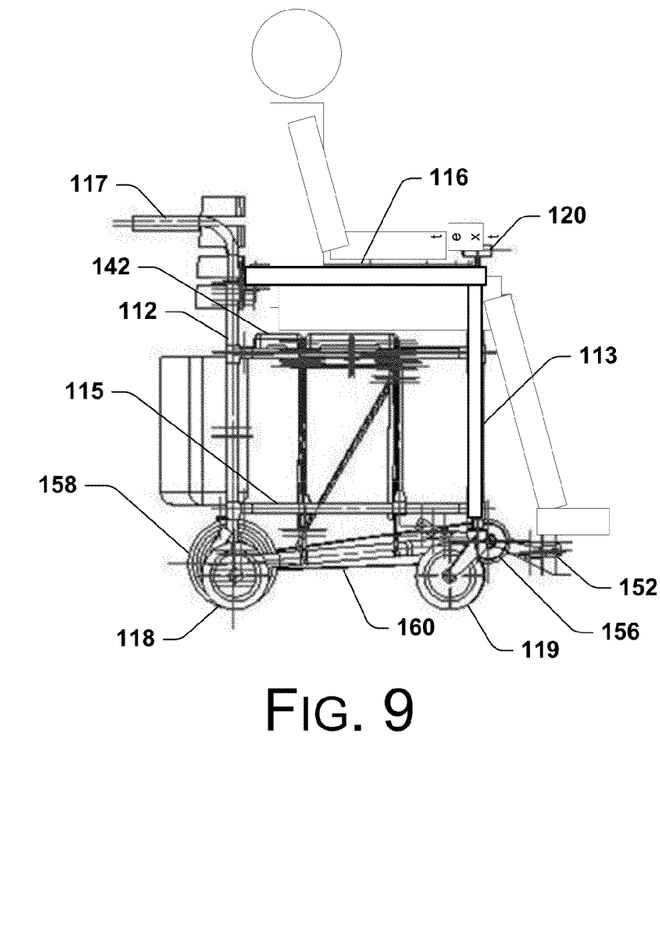
FIG. 9 is a side elevational view of the riding walker assembly of FIG. 1 in one mode of operation in accordance with the teachings of the present disclosure.

As shown in FIG. 9, in one mode of operation, a user may sit on the seat 130 with their arms resting on the armrest members 116 and with their feet engaged with the pedals 152 of the pedal drive assembly 150. As the user pedals the pedal drive assembly 150, the crankshaft member 154 rotates the drive pulley 156, causing the drive belt 160 to rotate the drive wheel 158. The rotating drive wheel 158 is engaged with a floor or ground surface, thereby driving the riding walker assembly 100 forward or aft depending upon the direction of rotation of the crankshaft member 154. The user may operate the steering knobs 120 to steer the riding walker assembly 100 along a desired path.

Figure 10:
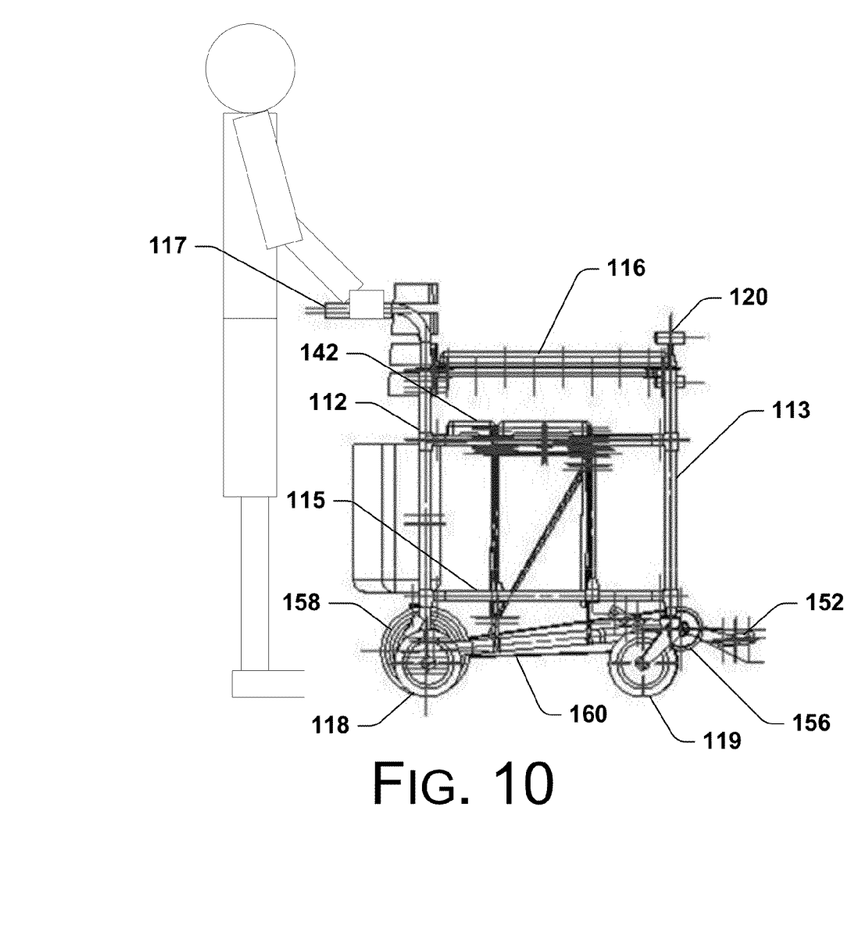
FIG. 10 is a side elevational view of the riding walker assembly of FIG. 1 in another mode of operation in accordance with the teachings of the present disclosure.

In another mode of operation depicted in FIG. 10, a user may stand in an upright position with their hands grasping the handles 117. The user may then walk and push the riding walker assembly 100 ahead of them, using the riding walker assembly 100 for balance and/or support as they walk. A brake release is provided on one handle.

Figure 11:
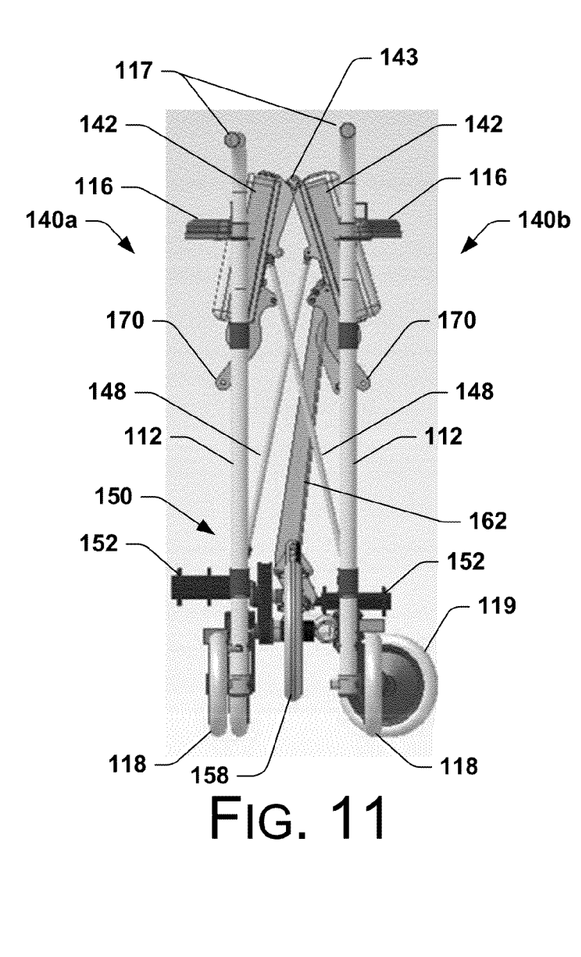
FIG. 11 is an isometric view of the riding walker assembly of FIG. 1 in a folded position in accordance with the teachings of the present disclosure.

In yet another mode of operation depicted in FIG. 11, a user may lift the hinged foldable seat members 142 along the hinge line 143, causing the foldable seat members 142 to fold along the hinge line 143, thereby allowing the right and left side assemblies 140a, 140b of the frame assembly 110 to move inwardly toward each other. As the left and right side assemblies 140a, 140b move inwardly, the handles 170 swing downwardly drawing the forward struts 162 upwardly, raising the pedal drive assembly 150 and lifting the drive wheel 158 away from the floor surface. In this way, the riding walker assembly 110 may be moved from a deployed configuration (shown in FIGS. 1, 9 and 10) to a folded position (FIG. 11) for storage or transport.

Embodiments of riding walker assemblies in accordance with the teachings of the present disclosure may provide considerable advantages over prior art apparatus and methods. For example, riding walker assemblies having pedal drive assemblies in accordance with the teachings of the present disclosure may advantageously enable a user to enjoy the usual and customary benefits of conventional wheel chair apparatus and walker apparatus, but may also provide improved mobility and utility in comparison to conventional apparatus. For example, in some embodiments, depending on the size of the drive pulley 156, a single revolution of the pedals 152 of the pedal drive assembly 150 may advance the riding walker assembly 100 by 6 linear feet. Adjusting the size of the drive pulley 156 may increase or decrease this distance according to the strength of the occupant, thereby providing improved mobility to a user of the assembly 100.

In addition, systems and methods in accordance with the present disclosure may also provide additional capability to exercise their legs using the pedal drive assembly whenever they so desire. Using riding walker assemblies in accordance with the present disclosure, a user may exercise their legs while in a seated position, and may travel along a desired travel path while in a seated position without the need for exerting their upper body. Providing the capability to pedal in accordance with the present disclosure may have considerable therapeutic and physiological advantages over conventional assemblies which require a user to walk upright to exercise their legs. Similarly, providing a capability to travel while in a seated position using the pedal drive assembly may provide considerable advantages to those users who have healthy legs and who may not have healthy arms or upper body as required by conventional wheel chair apparatus.

Figure 16:
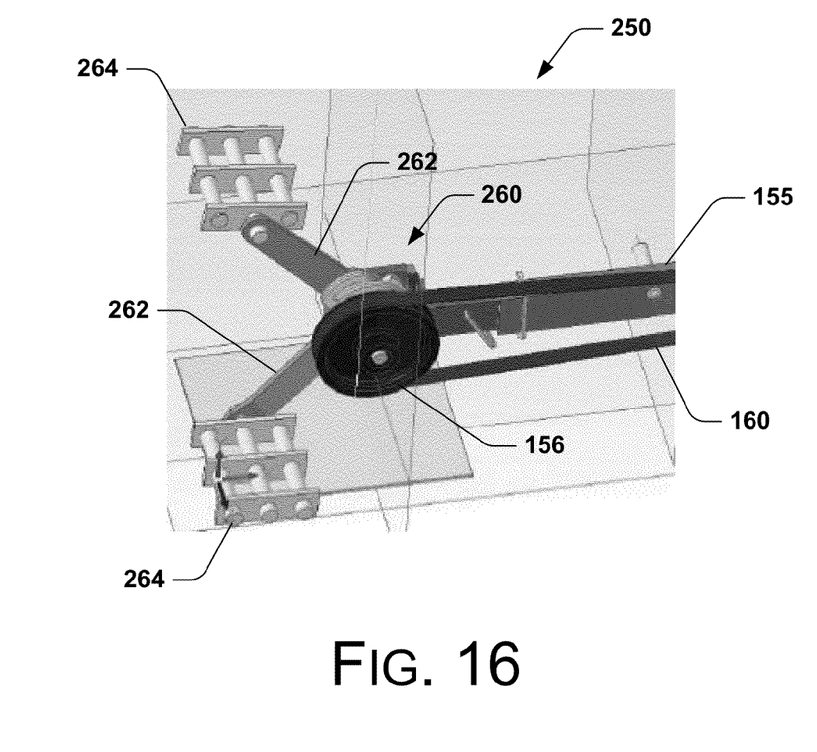
FIG. 16 is an isometric view of an embodiment of an oscillating drive assembly in accordance with the teachings of the present disclosure.
Figure 17:
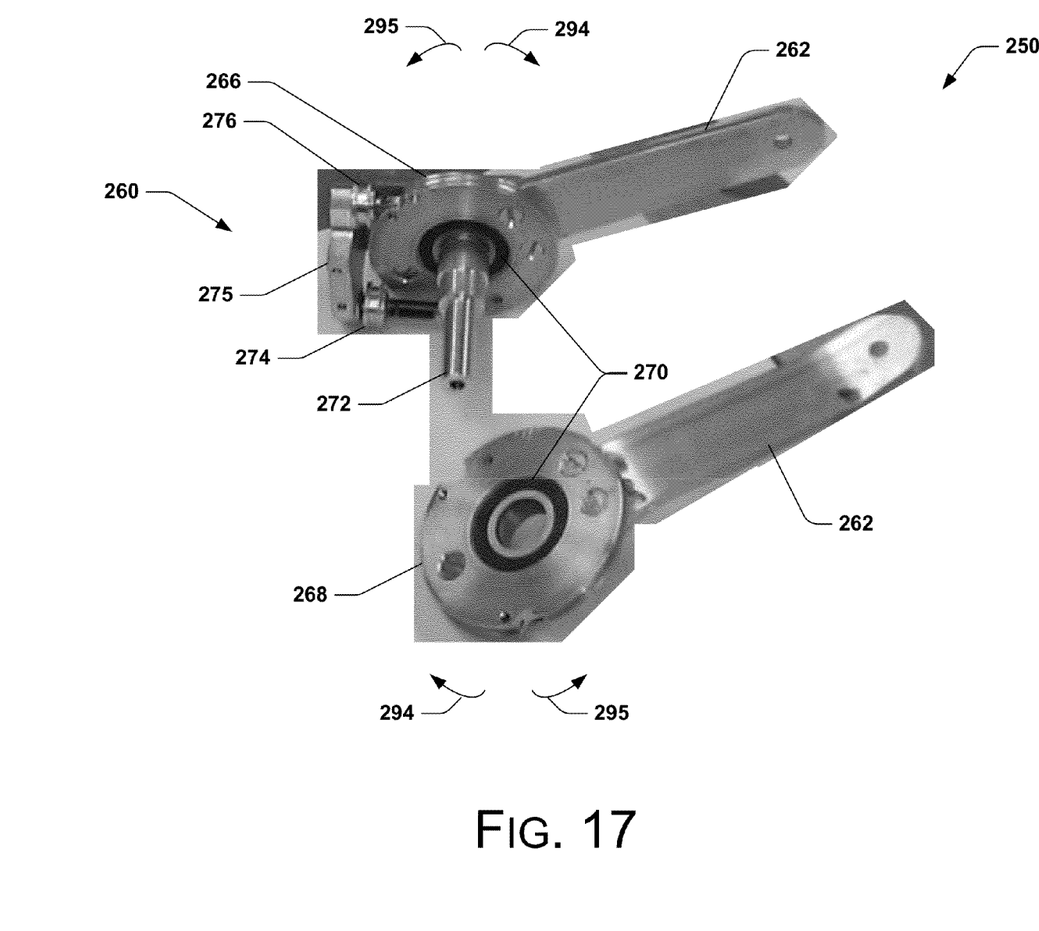
FIG. 17 is a partially exploded isometric view of the oscillating drive assembly of FIG. 16.

It will be appreciated that alternate embodiments in accordance with the teachings of the present disclosure may be conceived, and that the scope of the present disclosure is not limited merely to the embodiments described above. For example, FIG. 16 is an isometric view of an embodiment of an oscillating drive assembly 250 in accordance with the teachings of the present disclosure. FIG. 17 is a partially exploded isometric view of the oscillating drive assembly 250 of FIG. 16. In this embodiment, the oscillating drive assembly 250 includes an oscillating clutch assembly 260 having first and second cable drums 266, 268 (FIG. 17). A pedal drive arm 262 is coupled to each of the first and second cable drums 266, 268, and a pedal 264 (FIG. 16) is coupled to each of the drive arms 262. Each of the first and second cable drums 266, 268 includes a one-way clutch 270, and the one-way clutches 270 are operatively mounted on a drive shaft 272. The drive pulley 156 (FIG. 16) is also mounted on the drive shaft 272.

As used herein, the term "one-way clutch" 270 is used to refer to a device that will transmit a drive force when rotated in one direction and will rotate freely (or "freewheel") without transmitting a drive force when rotated in the opposite direction. The structure and operational aspects of such "one-way clutches" are generally known, and for the sake of brevity will not be described in detail herein.

Figure 18:
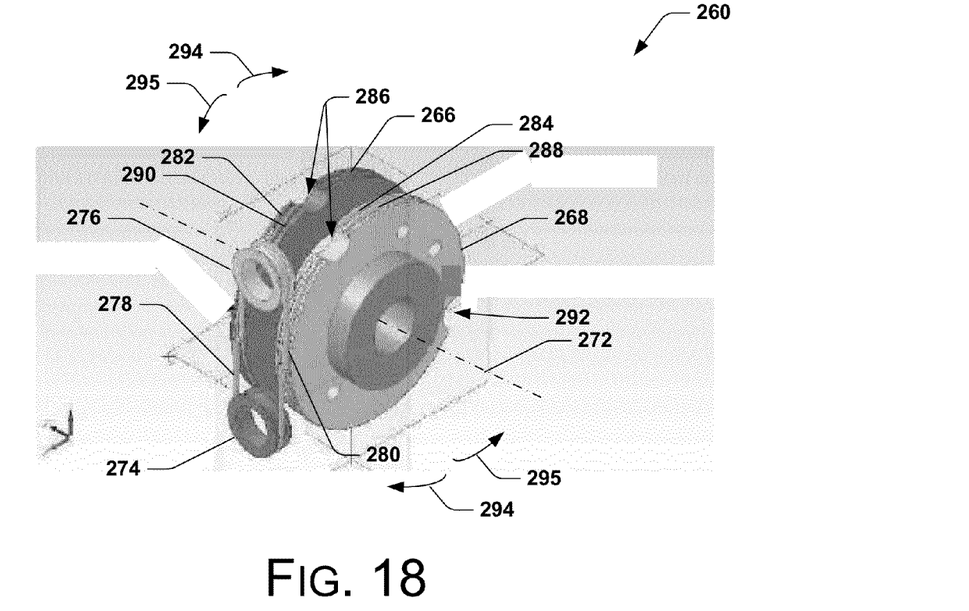
FIG. 18 is an isometric view of an oscillating clutch assembly of the oscillating drive assembly of FIG. 16.

As shown in FIG. 17, the oscillating clutch assembly 260 further includes first and second cable guides 274, 276 which are mounted on a guide plate 275. FIG. 18 is an enlarged, isometric partial view of the clutch assembly 260 of the oscillating drive assembly 250 of FIG. 16. For clarity, the guide plate 275 shown in FIG. 17 is removed in FIG. 18 to provide an unobstructed view of certain aspects of the oscillating clutch assembly 260. More specifically, in at least some embodiments, the oscillating clutch assembly 260 includes first and second cables 278, 280. The first cable 278 has a first end portion that is secured to the first cable drum 266, and then the first cable 278 is reeved at least partially about the first cable drum 266. As shown in FIG. 18, in at least some embodiments, one or more first grooves 282 may be disposed in an outer surface of the first cable drum 266 to receive and guide the first cable 278 as it is reeved at least partially about the first cable drum 266.

After being reeved at least partially about the first cable drum 266, the first cable 278 then extends over the first cable guide 274, and is at least partially reeved about the second cable drum 268. In at least some embodiments, one or more second grooves 284 may be disposed in an outer surface of the second cable drum 268 to receive and guide the first cable 278 as it is reeved at least partially about the second cable drum 268. A second end portion of the first cable 278 is secured to the second cable drum 268. In at least some embodiments, indentations 286 are provided in the first and second cable drums 266, 268 that provide access to set screws (not shown) or other suitable devices for securing the first and second end portions of the first cable 278 to the first and second cable drums 266, 268.

Similarly, the second cable 280 has a first end portion that is secured to the second cable drum 268, and then the second cable 280 is reeved at least partially about the second cable drum 268. In at least some embodiments, one or more third grooves 288 may be disposed in an outer surface of the second cable drum 268 to receive and guide the second cable 280 as it is reeved at least partially about the second cable drum 268. After being reeved at least partially about the second cable drum 268, the second cable 280 then extends over the second cable guide 276, and is at least partially reeved about the first cable drum 266. In at least some embodiments, one or more fourth grooves 290 may be disposed in an outer surface of the first cable drum 266 to receive and guide the second cable 280 as it is reeved at least partially about the first cable drum 266. A second end portion of the second cable 280 is secured to the first cable drum 266. Again, in at least some embodiments, indentations 292 (one visible) are provided in the first and second cable drums 266, 268 that provide access to set screws (not shown) or other suitable devices for securing the first and second end portions of the second cable 280 to the first and second cable drums 266, 268.

In operation, as a user applies force to the pedal 264 of the pedal drive arm 262 that is coupled to the first cable drum 266 (FIGS. 16-17) (or "first" pedal), the pedal 264 is forced downwardly in a forward direction, thereby rotating the first cable drum 266 in a first rotational direction 294 and driving the riding walker assembly 100 forward over the floor surface. The first cable 266 is pulled by the rotation of the first cable drum 266, and a resulting tension in the first cable 266 causes the second cable drum 268 to rotate in a second rotational direction 295. The rotation of the second cable drum 268 in the second rotational direction 295 causes the pedal 264 of the pedal drive arm 262 that is coupled to the second cable drum 266 (FIGS. 16-17) (or "second" pedal) to be raised up as the "first" pedal 264 is pushed down.

After the "first" pedal 264 has been pushed through a desired arc length (e.g. 45 degrees), the user may then apply a driving force to the "second" pedal 264 (i.e. the pedal 264 of the pedal drive arm 262 that is coupled to the second cable drum 268), thereby rotating the second cable drum 268 in the first rotational direction 294 and driving the riding walker assembly 100 forward over the floor surface. As the second cable drum 268 rotates in the first rotational direction 294, a resulting tension in the second cable 268 causes the first cable drum 266 to rotate in the second rotational direction 295, causing the "first" pedal 264 to be raised up for the next drive stroke. In this way, the pedals 264 "oscillate" through a partial arc length, and do not rotate through an entire 360 degree rotation about the axis of the drive shaft 272.

As the "first" pedal 264 is rotated in the first rotational direction 294 through the desired arc length, the drive pulley 156 rotates to drive the riding walker assembly 100 forward, and the "second" pedal 264 is raised into position for the next power stroke. Similarly, as the "second" pedal 264 is rotated in the first rotational direction 294 through the desired arc length, the drive pulley 156 continues to rotate to drive the riding walker assembly 100 forward, and the "first" pedal 264 is raised into position for the next power stroke. As the above-described process is repeated, the user propels the riding walker assembly 100 by oscillating (or "pumping") the pedals 264 through the desired arc length. Any slight motion rotates the shaft (and the drive pulley 256) so +−5 degree rotation will cause the riding walker assembly to move forward (e.g. for persons who may have difficulty pedaling).

Figure 19:
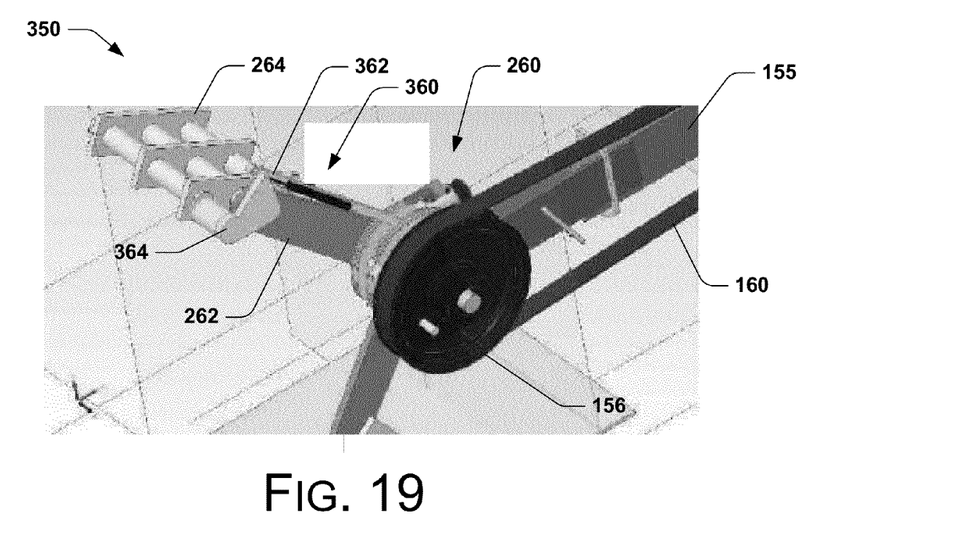
FIG. 19 is an isometric view of an alternate embodiment of an oscillating drive assembly of having a foot brake assembly in accordance with the teachings of the present disclosure.

FIG. 19 is an isometric view of an alternate embodiment of an oscillating drive assembly 350 in accordance with the teachings of the present disclosure. It will be appreciated that many of the structural components and operational aspects of the embodiment of the oscillating drive assembly 350 shown in FIG. 19 are the same as (or substantially similar to) the components and aspects of the oscillating drive assembly 250 described above with respect to FIGS. 16-18. Therefore, for the sake of brevity, a detailed description of such components and operational aspects will not be repeated, and only the new aspects and components of the oscillating drive assembly 350 will be described.

Figure 20:
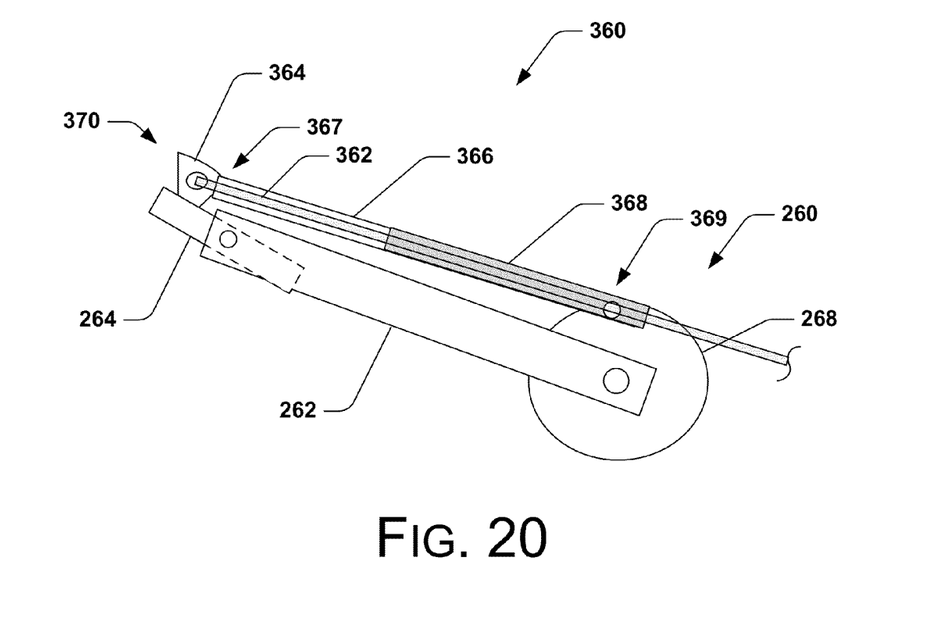
FIG. 20 is a schematic representation of the foot brake assembly of FIG. 19 in a first position in accordance with the teachings of the present disclosure.

As shown in FIG. 19, in this embodiment, the oscillating drive assembly 350 includes a foot brake assembly 360. FIG. 20 shows an enlarged, side schematic view of the foot brake assembly 360 of FIG. 19. In this embodiment, the foot brake assembly 360 includes a foot brake cable 362 having a first end coupled to a cable mount 364 that is, in turn, coupled to and rotatable with the pedal 264 (see FIG. 19). The foot brake cable 362 extends through a first cable sheath 366 have an end portion pivotably coupled to the cable mount 364 at a first pivot point 367. The foot brake cable 362 then extends through a second cable sheath 368 having an end portion pivotably coupled to the oscillating clutch assembly 260 at a second pivot point 369. After passing through the second cable sheath 368, the foot brake cable 362 then extends to the brake collector assembly 220 (see FIGS. 13 and 14) and operatively attaches to the brake collector assembly 220 (e.g. as cable 209) to actuate the distal brake assembly 240 (FIG. 15).

Referring again to FIG. 20, in operation, with the pedal 264 positioned in a non-braking (or nominal) position 370, the user may actuate the oscillating drive assembly 350 as described above to propel the riding walker assembly 100. As the pedal 264 is oscillated (or pumped), the first cable sheath 366 pivots about the first pivot point 367 and the second cable sheath 368 pivots about the second pivot point 369, and the first and second cable sheaths 366, 368 slideably engage (e.g. first cable sheath 366 slides into second cable sheath 368, or vice versa) such that the overall length of the combined first and second cable sheaths 366, 368 varies according to the movement of the pedal drive arm 262 through the desired arc length. The non-braking position 370 of the pedal 264 enables the user to oscillate the oscillating drive assembly 350 to propel the riding walker assembly 100 forward without (or at least substantially without) applying the brake shoe(s) 244 of the distal brake assembly 240.

Figure 21:
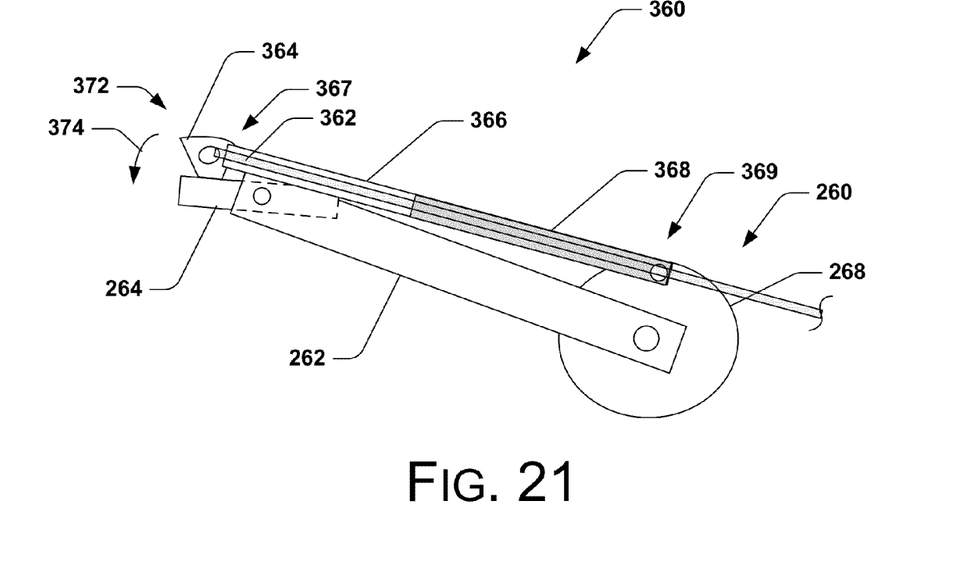
FIG. 21 is a schematic representation of the foot brake assembly of FIG. 19 in a second position in accordance with the teachings of the present disclosure.

Referring now to FIG. 21, when the user decides to apply brakes using the foot brake assembly 360, the user rotates the pedal 264 in a "toe-down" rotational direction 374, thereby rotating the pedal 264 into a braking position 372. As the pedal 264 moves into the braking position 374, the first and second cable sheaths 366, 368 are slideably extended, and the foot brake cable 362 is drawn into tension, thereby applying a braking force to the brake collector assembly 220 (see FIGS. 13 and 14) and ultimately, to the brake shoe(s) 244 of the distal brake assembly 240 (FIG. 15). In this way, the user may slow or stop the movement of the riding walker assembly 100 using the foot brake assembly 360. Upon returning the pedal 264 to the non-braking position 370 (FIG. 20), the user may then continue to propel the riding walker assembly 100 as desired.

Again, systems and methods in accordance with the present disclosure may provide considerable advantages over prior art devices. More specifically, embodiments having "oscillating" drive assemblies in accordance with the teachings of the present disclosure may advantageously allow users to propel riding walker assemblies using an "oscillating" or "pumping" leg motion. Such embodiments may enable persons who may have difficulty operating fully rotational drive systems to enjoy the considerable therapeutic and physiological advantages of apparatus in accordance with the teachings of the present disclosure.

Figure 22:
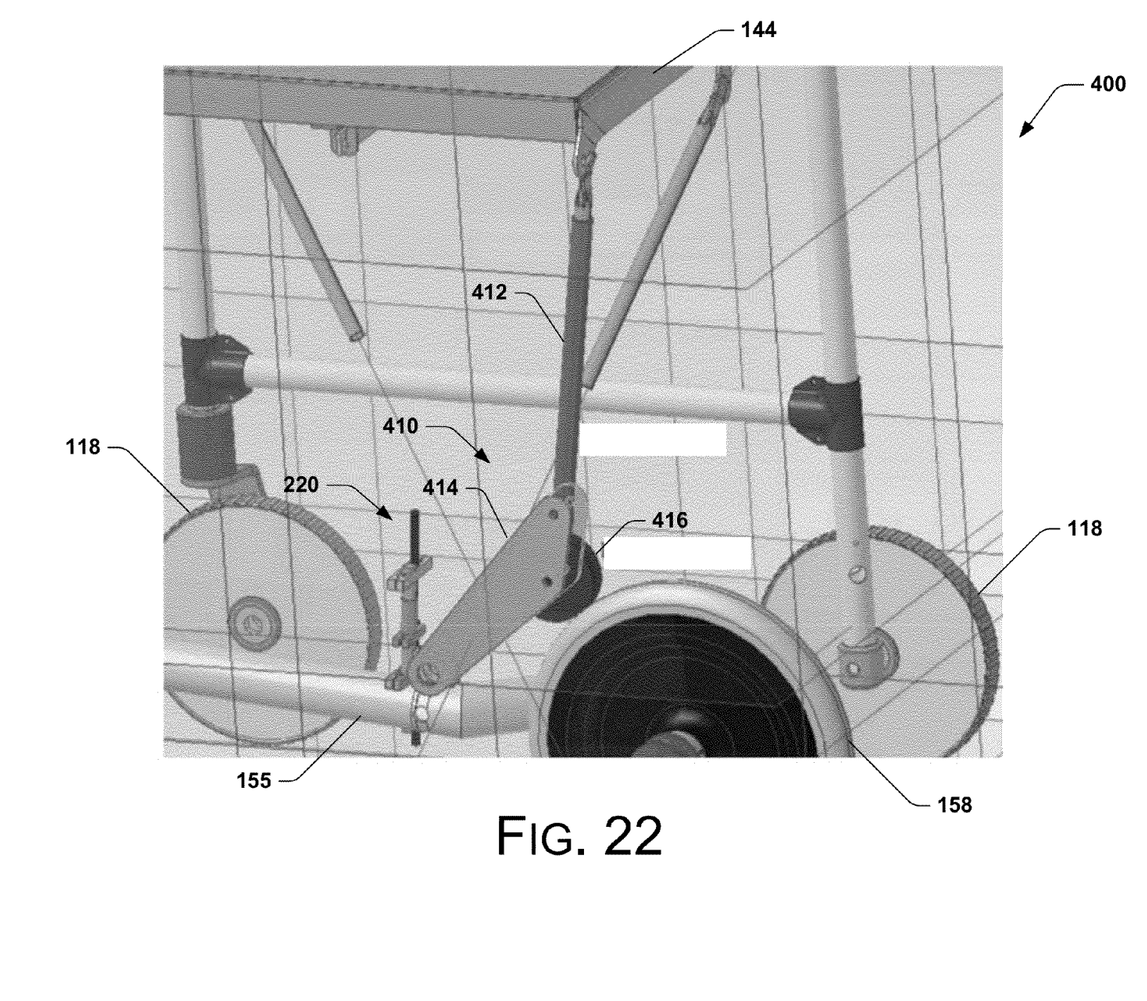
FIG. 22 is a partial isometric view of a riding walker assembly having a drag wheel assembly in accordance with the teachings of the present disclosure.

In still other embodiments, riding walker assemblies in accordance with the present disclosure may be configured to enable users to exercise their legs while the riding walker assembly remains in a stationary position. For example, FIG. 22 is a partial isometric view of a riding walker assembly 400 having a drag wheel assembly 410 in accordance with the teachings of the present disclosure. In this implementation, the drag wheel assembly 410 includes a drag strut 412 that extends downwardly from a stringer 144 of the seat assembly 130 to a drag wheel mount 414. The drag wheel mount 414 extends between the drag strut 412 and the support beam 155 of the pedal drive assembly 150. A drag wheel 416 is rotatably mounted to the drag wheel mount 414.

In operation, a user may actuate the handles 170 as described above to raise the drive wheel 158 away from the floor surface and into engagement with the drag wheel 416 as shown in FIG. 22. The drag wheel 416 may be configured to provide resistance to the rotation of the drive wheel 158 (e.g. by frictional engagement with the drag wheel mount 414) such that as the user pedals the pedal drive assembly 150 while the drive wheel 158 is raised into engagement with the drag wheel 416 (and not in contact with the floor surface), the user works against the resistance of the drag wheel 416 to exercise their legs while the riding walker assembly 400 remains in a stationary position. In this way, the user may exercise even without propelling the riding walker assembly 400 over the floor surface.

The detailed descriptions of the above embodiments are not exhaustive descriptions of all embodiments contemplated by the inventor to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the present disclosure. Accordingly, the scope of the invention should be determined from the following claims.

What is claimed is:

1. A riding walker assembly, comprising:
 a frame assembly including:
  a seat assembly extending between left and right side assemblies;
  a plurality of wheels operatively coupled to the left and right side assemblies and configured to rollably support the frame assembly on a floor surface; and
  at least one actuation mechanism moveable between first and second positions; and
 a drive assembly operatively coupled to the frame assembly by a coupling assembly, the drive assembly including:
  a drive wheel configured to engage the floor surface;
  a user interface operatively coupled to the drive wheel, the user interface being operably configured to enable a user seated in the seat assembly to apply a drive force that rotates the drive wheel to propel the riding walker assembly over the floor surface; and
 wherein the coupling assembly is configured to enable the user to selectively engage and disengage the drive wheel from the floor surface, and wherein the coupling assembly includes at least one strut coupled to the at least one actuation mechanism such that when the at least one actuation mechanism is positioned in the first position, the drive wheel is engaged with the floor surface, and when the at least one actuation mechanism is positioned in the second position, the drive wheel is disengaged from the floor surface, and wherein the drive assembly includes an elongated support member, the drive wheel being operatively coupled to the elongated support member, and wherein the at least one actuator comprises a pair of handles, each handle being coupled to a corresponding one of the left and right side assemblies, and wherein the at least one strut comprises a pair of struts, each strut being coupled between the elongated support member and a corresponding one of the handles.

2. The riding walker assembly of claim 1, wherein the drive assembly includes:
 a support member, the drive wheel being operatively coupled to the support member; and
 wherein the user interface includes:

a crank shaft rotatably coupled to the support member and spaced apart from the drive wheel;
a pair of pedals operatively coupled to the crank shaft;
a drive pulley operatively coupled to the crank shaft; and
a drive member coupled between the drive pulley and the drive wheel such that rotation of the crank shaft causes rotation of the drive wheel.

3. A riding walker assembly, comprising:
a frame assembly including:
  a seat assembly extending between left and right side assemblies; and
  a plurality of wheels operatively coupled to the left and right side assemblies and configured to rollably support the frame assembly on a floor surface; and
a drive assembly operatively coupled to the frame assembly by a coupling assembly, the drive assembly including:
  a drive wheel configured to engage the floor surface; and
  a user interface operatively coupled to the drive wheel, the user interface being operably configured to enable a user seated in the seat assembly to apply a drive force that rotates the drive wheel to propel the riding walker assembly over the floor surface, wherein the user interface includes:
    an oscillating clutch assembly; and
    first and second pedals operatively coupled to the oscillating clutch assembly such that each of the first and second pedals is rotatable through a desired arc length, the oscillating clutch assembly being configured such that as the first pedal is rotated in a drive direction through the desired arc length, the second pedal is rotated in an opposing direction through the desired arc length.

4. The riding walker assembly of claim 3, wherein the drive assembly includes an elongated support member, the drive wheel being operatively coupled to the elongated support member, and at least one actuator operatively coupled to the elongated support member and configured to move the drive wheel between first and second positions.

5. The riding walker assembly of claim 3, wherein the frame assembly is foldable such that as the left and right side assemblies are drawn inwardly toward each other, the drive wheel is disengaged from the floor surface.

6. The riding walker assembly of claim 3, wherein the frame assembly is foldable such that as the left and right side assemblies are drawn inwardly toward each other, the seat assembly folds along a hinge line.

7. The riding walker assembly of claim 3, wherein the frame assembly includes:
  at least one vertical support; and
  a steering knob positioned proximate an upper end portion of the at least one vertical support and operatively coupled to at least one of the plurality of wheels.

8. The riding walker assembly of claim 3, further comprising:
  a braking system selectively engageable with at least one wheel of the plurality of wheels.

9. The riding walker assembly of claim 8, wherein the braking system comprises:
  at least one pivotable handle;
  at least one brake cable operatively coupled between at least one handle and a toggle; and
  at least one secondary brake cable operatively coupled between the toggle and at least one brake shoe engageable with a corresponding at least one wheel of the plurality of wheels.

10. The riding walker assembly of claim 8,
wherein the braking system comprises:
  a foot brake assembly including a foot brake cable having a first end operatively coupled to a pedal of the drive assembly such that a rotation of the pedal applies at least one brake shoe with at least one wheel of the plurality of wheels.

\* \* \* \* \*